United States Patent [19]
Hanada et al.

[11] Patent Number: 5,884,875
[45] Date of Patent: Mar. 23, 1999

[54] STRUCTURE FOR MOUNTING AUTOMOTIVE INSTALLATION AND MOUNTING METHOD THEREOF

[75] Inventors: Kotaro Hanada, Hadano; Hiroaki Sasaki, Yokohama; Koji Takao, Atsugi; Shigenori Toyonaga; Nobu Shinoda, both of Sagamihara, all of Japan

[73] Assignee: Nissan Motor Co., Ltd., Yokohama, Japan

[21] Appl. No.: 635,656

[22] Filed: Apr. 22, 1996

[30] Foreign Application Priority Data

| Apr. 26, 1995 | [JP] | Japan | 7-102061 |
| Apr. 26, 1995 | [JP] | Japan | 7-102063 |
| Apr. 26, 1995 | [JP] | Japan | 7-102072 |

[51] Int. Cl.⁶ ............................................. G12B 7/00
[52] U.S. Cl. ................................. 248/27.1; 248/674
[58] Field of Search ....................... 248/27.1, 27.3, 248/674; 296/192, 70; 280/779; 180/90

[56] References Cited

U.S. PATENT DOCUMENTS

| 5,082,078 | 1/1992 | Umeda et al. | 180/90 |
| 5,387,023 | 2/1995 | Deneau | 296/72 |
| 5,685,595 | 11/1997 | Nishijima et al. | 296/70 |

FOREIGN PATENT DOCUMENTS

| 57-10945 | 6/1980 | Japan . |
| 57-39829 | 8/1980 | Japan . |
| 58-218451 | 6/1982 | Japan . |
| 60-171768 | 4/1984 | Japan . |
| 7-052683 | 2/1993 | Japan . |

*Primary Examiner*—Leslie A. Braun
*Assistant Examiner*—Gwendolyn Baxter
*Attorney, Agent, or Firm*—Foley & Lardner

[57] ABSTRACT

A mounting structure for mounting an air conditioning unit to a vehicle body and an method of mounting the unit are provided. The structure includes an instrument panel, a steering member and brackets. In assembling, the air conditioning unit and a heater control unit are fixed to the steering member through the brackets, at first. After control cables of the heater control unit has been connected to the air conditioning unit, the instrument panel is assembled to a vehicle body while allowing the heater control unit through the opening of the instrument panel. Therefore, it is possible for a worker to carry out both assembling of the air conditioning unit and the heater control unit and electrical connecting of the control cables in a free space without being restricted in terms of operative directions and posture, so that the workability can be improved remarkably.

18 Claims, 13 Drawing Sheets

STRUCTURE FOR MOUNTING AUTOMOTIVE INSTALLATION AND MOUNTING METHOD THEREOF

BACKGROUND OF THE INVENTION

Field of the Invention

The present invention relates to a mounting structure for mounting an automotive installation, such as an air conditioning unit, an audio unit or the like, and a method of mounting the same to a vehicle body.

In Japanese Unexamined Utility Model Publication (kokai) Nos. 57-10945 and 57-39829 etc., there is known a structure for mounting the automotive installation where an air conditioning unit is fixed on a top section and an under section of a dash panel of an automobile, while a heater control unit to control the temperature and operational modes of the air conditioning unit is secured on an instrument panel of the automobile.

In the above-mentioned structure, since the air conditioning unit has been secured to the dash panel and after that, the instrument panel has been fitted to the vehicle body, the heater control unit is assembled in the instrument panel. Therefore, in connecting control cables of the heater control unit to operated parts of the air conditioning unit, a worker has to crouch to get into the underside of the instrument panel for connecting work, thereby getting worse in workability.

Alternatively, since it is necessary to make sure of long surpluses for the control cables in view of the workability, such a countermeasure accompanies an additional process to adjust the lengths of the control cables after connecting, increasing a number of manufacturing processes disadvantageously.

Such a problem also arises in wiring an automotive harness for supplying electricity for electrical installations.

In Japanese Patent Publication (kokai) No. 58-218451 and Japanese Utility Model Publication (kokai) No. 60-171768 etc., there is known a structure for wiring the automotive harness where the automotive harness is fixed to the back of an instrument panel or the back of a cowl box on the top of a dash panel by means of hooking members, such as clamps, clips or the like, while connectors at the end of the harness are secured on a dash side panel and engaged with both connectors at the end of a harness extending from an engine room and connectors at the end of another harness extending from a vehicle body. Note, the former harness extending from the engine room will be referred to "engine-room side harness" while the latter harness extending from the vehicle body will be referred to "vehicle side harness", hereinafter.

In the wiring structure mentioned above, the connectors, which are arranged at the end of the harness on the back of the instrument panel or the cowl box, are fixed on the dash side panel and adapted so as to engage with the other connectors at the ends of the engine-room side harness and the vehicle side harness after assembling the instrument panel to the vehicle body. Therefore, in order to connect the former connectors to the latter connectors, the worker has to crouch to get into the underside of the instrument panel for connecting work, thereby getting worse in workability.

Moreover, since the instrument panel is apt to hide the connection area among the connectors from view, it is difficult to make an inspection of electrical connection among the connectors.

SUMMARY OF THE INVENTION

It is therefore an object of the present invention to provide a mounting structure for mounting an automotive installation and a method of mounting the same, by which it is possible to facilitate a wiring of an automotive installation, not to mention a mounting of the installation on the vehicle body, and it is possible to shorten the length of control cables (or a harness) of the installation, whereby a work to adjust the length of the cables can be excluded to improve the workability remarkably.

It is another object of the present invention to provide a wiring structure for a harness, by which it is possible to facilitate a wiring of the harness and a connecting operation among connectors operation, and also an inspection of a condition of the connection.

The former object of the present invention described above can be accomplished by a mounting structure for mounting an installation for a vehicle, the mounting structure comprising:

an instrument panel provided with an opening for arranging the installation;

a steering member arranged inside the instrument panel so as to extend to a direction of width of the vehicle; and brackets arranged on the steering member for mounting the installation on the steering member, wherein, after a wiring of the installation has been completed, the instrument panel is assembled to a vehicle body while allowing the installation through the opening of the instrument panel.

In the present invention, preferably, the installation comprises an air conditioning unit and a heater control unit for controlling operation of the air conditioning unit;

the wiring of the installation is to connect control cables of the heater control unit to an operated section of the air conditioning unit; and the instrument panel is assembled to the vehicle body while passing the heater control unit through the opening of the instrument panel.

With the arrangement mentioned above, since the air conditioning unit and the heater control unit are fixed to the steering member through the brackets while the control cables are connected to the operated section of the air conditioning unit before the instrument panel is attached to the vehicle body, it is possible for a worker to carry out both assembling of the air conditioning unit and the heater control unit and electrical connecting of the control cables in a free space without being restricted in terms of operative directions and posture, so that the workability can be improved remarkably.

Again, since the air conditioning unit and the heater control unit are fixed to the steering member as a reinforcement on the vehicle's body side, the mounting stability of the air conditioning unit and the heater control unit can be progressed advantageously.

In addition, since the connecting work of the control cables can be easily executed in the free space before assembling the instrument panel and there is no need to ensure surpluses of the cables in length in order to improve the connecting workability, it is possible to shorten the cables and to reduce the number of working processes with a deletion of process for adjusting the length of the cables.

Moreover, since the instrument panel is attached to the vehicle body while allowing the heater control unit fixed on the steering member through the opening, it is possible to assemble the long instrument panel on the vehicle body appropriately on positioning the panel on the basis of the heater control unit fixed to the steering member, so that an adjustment in assembling can be eliminated. Further, since such an arrangement allows the instrument panel to be fitted on the heater control unit temporary, the assembling workability of the instrument panel can be improved.

More preferably, the heater control unit is provided with mounting brackets which are fastened to the brackets;

the instrument panel has side flanges formed on both sides of the opening; and the side flanges are fastened to the mounting brackets, respectively.

In this case, since the side flanges of the opening are fixed to the mounting brackets of the heater control unit in this way, the mounting faces of the second brackets for fixing the mounting brackets can be reduced thereby to miniaturize the brackets while it is possible to enlarge degrees of freedom in designing the fastening structures between the second brackets and the mounting brackets and also between the side flanges and the mounting brackets. In addition, the mating condition between the opening and the heater control unit can be enhanced thereby to improve its quality appearance.

In the present invention mentioned above, preferably, each of the mounting brackets of the heater control unit is provided on a mount face thereof with a locating pin, while each of the brackets of the steering member is provided on a mount face thereof with a locating hole in engagement with the locating pin and each of the mounting brackets of the heater control unit is provided on another mount face thereof with another locating pin, while each of the side flanges of the instrument panel is provided on a mount face thereof with a locating hole in engagement with the another locating pin.

In this case, owing to the engagement of the locating pins with the locating holes, the heater control unit and the instrument panel can be positioned in a suitable manner, while it is possible to improve the workability in assembling the heater control unit and the instrument panel.

In the present invention, preferably, the air conditioning unit is provided with locating pins, while the brackets of the steering member are provided on respective mount faces thereof with locating holes in engagement with the locating pins of the air conditioning unit.

Also in this case, owing to the engagement of the locating pins with the locating holes, the air conditioning unit can be positioned in a suitable manner, while it is possible to improve the workability in assembling the air conditioning unit.

Preferably, the steering member is provided on a front portion thereof with a flat plane on which a rear face of the air conditioning unit is to be overlaid and abutted, the front portion facing an engine room of the vehicle.

In this case, since the air conditioning unit has the rear face overlaid and abutted on the flat part of the steering member on the front side, the assembling stability of the air conditioning unit can be enhanced while it is possible to avoid stress concentration, so that the mounting rigidity of the air conditioning unit can be increased.

In the above-mentioned invention, it is also preferable that the installation comprises an audio unit to be mounted in the instrument panel;

the wiring of the installation is to connect a harness of the audio unit to the steering member; and the instrument panel is assembled to the vehicle body while passing the audio unit through the opening of the instrument panel.

According to the above-mentioned mounting structure, before the instrument panel is attached to the vehicle body, the audio unit is fixed to the steering member through the brackets while the harness is also connected to the steering member. Thus, it is possible for a worker to carry out both assembling operation of the audio unit and connecting operation of the harness in the free space without being restricted in terms of operative directions and posture, so that the workability can be improved remarkably.

Since the audio unit is fixed to the steering member as a reinforced member on the vehicle side, it is possible to enhance the stability in mounting the audio unit.

Moreover, since the harness is supported by the steering member, it is possible to reduce a length of the harness from its drawn portion through the supported portions. In addition, since the harness can be easily connected to the steering member in the free space on the side of the vehicle room and there is no need to ensure a surplus of harness in length in order to improve the connecting workability, it is possible to shorten the harness per se.

Additionally, since the instrument panel is attached to the vehicle body while allowing the audio unit fixed on the steering member through the opening, it is possible to assemble the long instrument panel on the vehicle body appropriately on positioning the panel on the basis of the audio unit fixed to the steering member, so that an adjustment in assembling can be eliminated. Further, since such an arrangement allows the instrument panel to be fitted on the audio unit temporary, the assembling workability of the instrument panel can be improved.

It is preferable that the instrument panel has side flanges formed on both sides of the opening and the side flanges are fixed on the brackets so as to overlap with rear faces of the brackets, respectively.

In this case, since the side flanges of the opening in the instrument panel are fastened to the mounting brackets of the audio unit respectively, the mating condition between the opening and the unit can be enhanced thereby to improve its quality appearance.

Moreover, since the side flanges are overlaid on the rear faces of the brackets and fastened thereto, such an arrangement allows this fastening and fixing operation to be carried out in the free space behind the instrument panel easily.

The latter object of the present invention described above can be also accomplished by a wiring structure for a harness, the wiring structure comprising:

an instrument panel provided with an opening for arranging the installation;

a steering member arranged inside the instrument panel so as to extend in a direction of width of the vehicle;

a main harness wired along the steering member for supplying electricity to the installation;

an "engine-room side" harness for supplying electricity to an installation in an engine room of the vehicle;

a "vehicle side" harness for supplying electricity to another installation on the rear side of the vehicle;

a bracket fixed on the steering member;

first connectors connected to an end of the main harness and fitted in the bracket in a manner that a connecting orifice of the first connector directs upward; and second connectors connected to respective ends of the "vehicle side" and "vehicle side" harnesses, the second connectors being to be engaged with the first connectors from their upward;

wherein, after the engagement of the second connectors with the first connectors have been completed, the instrument panel is assembled to the vehicle body so that the steering member is inside the instrument panel. In this case, since the main harness is wired along the steering member extending in the direction of width of the vehicle at a front waist portion in the vehicle room and fixed to the steering member by the hooking members before assembling the instrument panel to the vehicle body, it is possible for the worker to carry out the wiring operation easily without taking any forced posture, such as a crouch.

Similarly, owing to the arrangement where the first connectors at the end of the main harness are fitted in the brackets so that the respective connecting orifices direct upwardly, it is also possible for the worker to connect the first connectors to the second connectors easily from the upside.

Again, since the first and second connectors are connected to each other prior to the assembly of the instrument panel to the vehicle body, a visual inspection for the electrical connection therebetween can be executed easily and precisely.

In the present invention mentioned above, preferably, the bracket is positioned in the vicinity of the opening of the instrument panel.

In this case, since the bracket on the steering member is positioned so as to correspond to the opening, it is possible for the worker to accomplish the checking of connection between the first and second connectors through the opening with ease.

According to the present invention, there is also provided a method of mounting an installation for a vehicle, the method comprising steps of:

fixing the installation to a steering member through brackets, the steering member being arranged inside an instrument panel of the vehicle;

carrying out wiring of the installation; and thereafter, assembling the instrument panel to a vehicle body while allowing the installation through an opening formed in the instrument panel.

In the above method of the invention, preferably, the installation comprises an air conditioning unit and a heater control unit for controlling operation of the air conditioning unit;

the brackets consist of first brackets and second brackets;

the fixing step is to fasten the conditioning unit to the first brackets mounted on the steering member while fastening the heater control unit to the second brackets mounted on the steering member;

the wiring is to connect control cables of the heater control unit to operated parts of the air conditioning unit;

the assembling step comprises steps of:

fastening the steering member to which the air conditioning unit and the heater control unit have been assembled, to the vehicle body;

allowing the heater control unit through the opening thereby to fasten the instrument panel to the vehicle body; and fastening side edges of the opening to the heater control unit.

With the method mentioned above, since both of the air conditioning unit and the heater control unit can be assembled to the steering member in the sub-line while the control cables can be easily connected in the free space, it is possible to realize an automatic assembling of both units in the sub-line, easily.

Furthermore, by assembling the steering member with both units to the vehicle body in the main line of the manufacturing process, it is possible to mount the air conditioning unit and the heater control unit on the vehicle body all at once, so that the automatic assembling of the units can be accomplished easily. Further, since the instrument panel can be easily assembled on the basis of the heater control unit fixed to the steering member, the automatic assembling of the instrument panel can be realized thereby to improve a productivity of the vehicle.

Alternatively, it is preferable that the installation comprises an audio unit to be mounted in the instrument panel;

the wiring step of the installation is to connect a harness of the audio unit to the steering member; and the assembling step is to assemble the instrument panel to the vehicle body while allowing the audio unit through the opening of the instrument panel.

The above and other features and advantages of this invention will become apparent, and the invention itself will best be understood, from a study of the following description and appended claims, with reference had to the attached drawings showing a preferred embodiment of the invention.

DESCRIPTION OF THE PREFERRED EMBODIMENT

Figure 1:
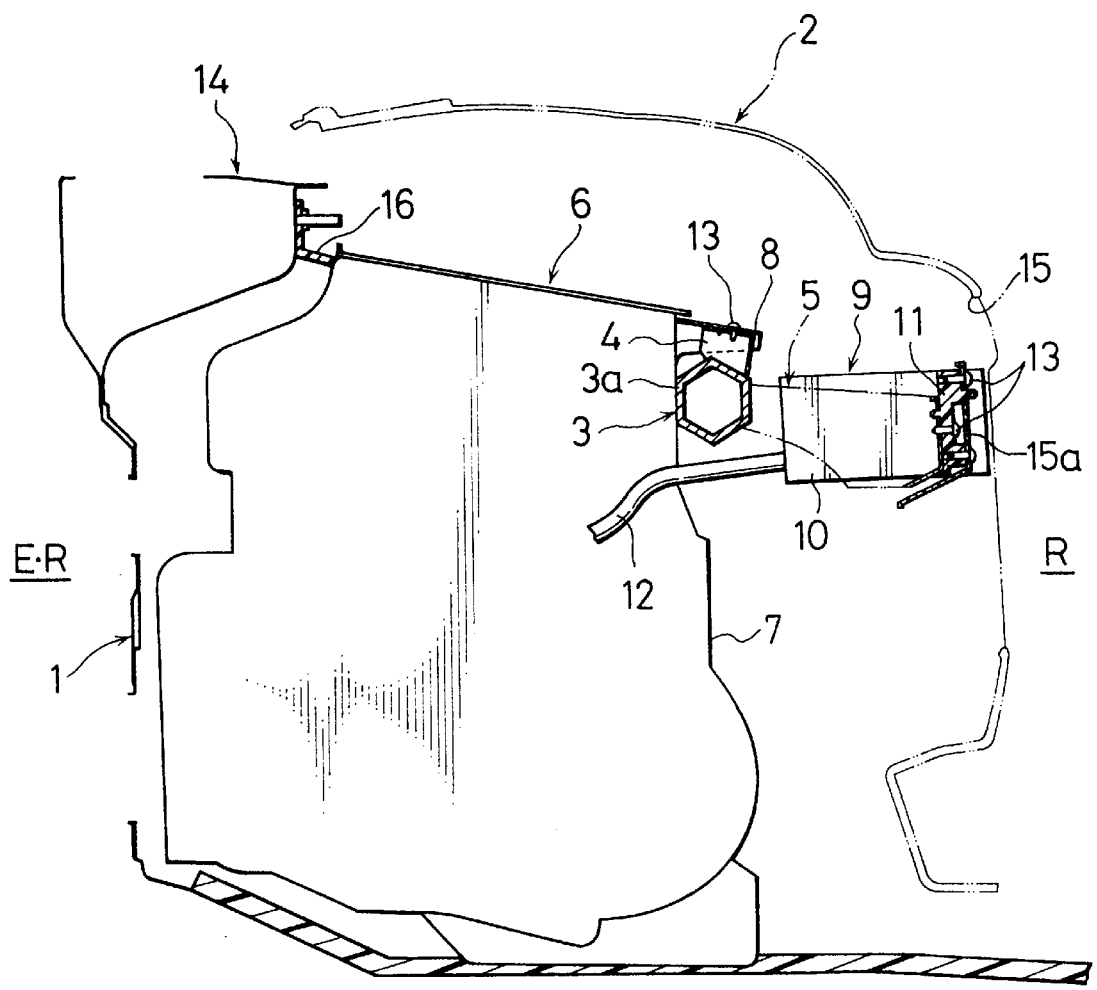
FIG. 1 is a cross sectional view of a mounting structure in accordance with a first embodiment of the present invention.
Figure 2:
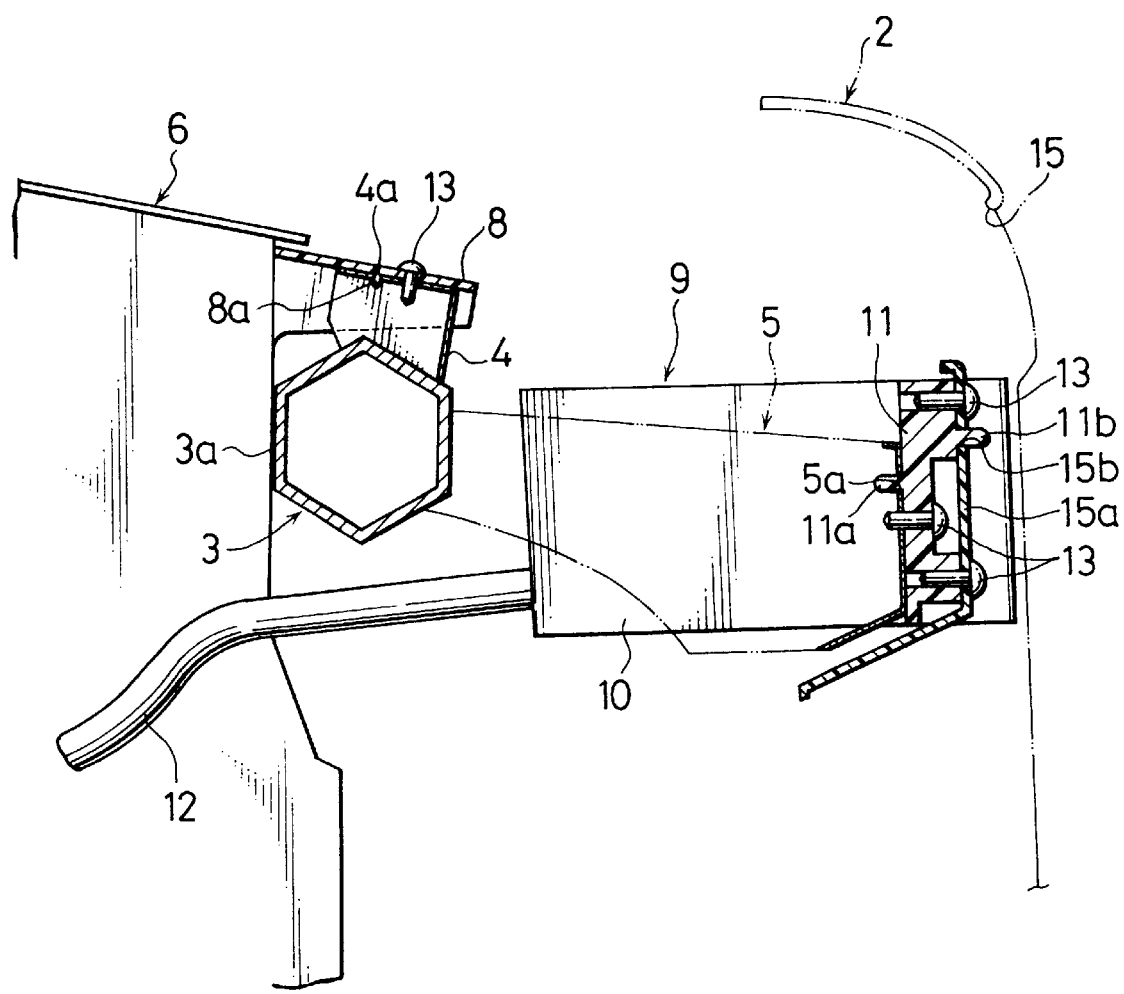
FIG. 2 is an enlarged cross sectional view of the mounting structure of FIG. 1, showing an essential part thereof.
Figure 3:
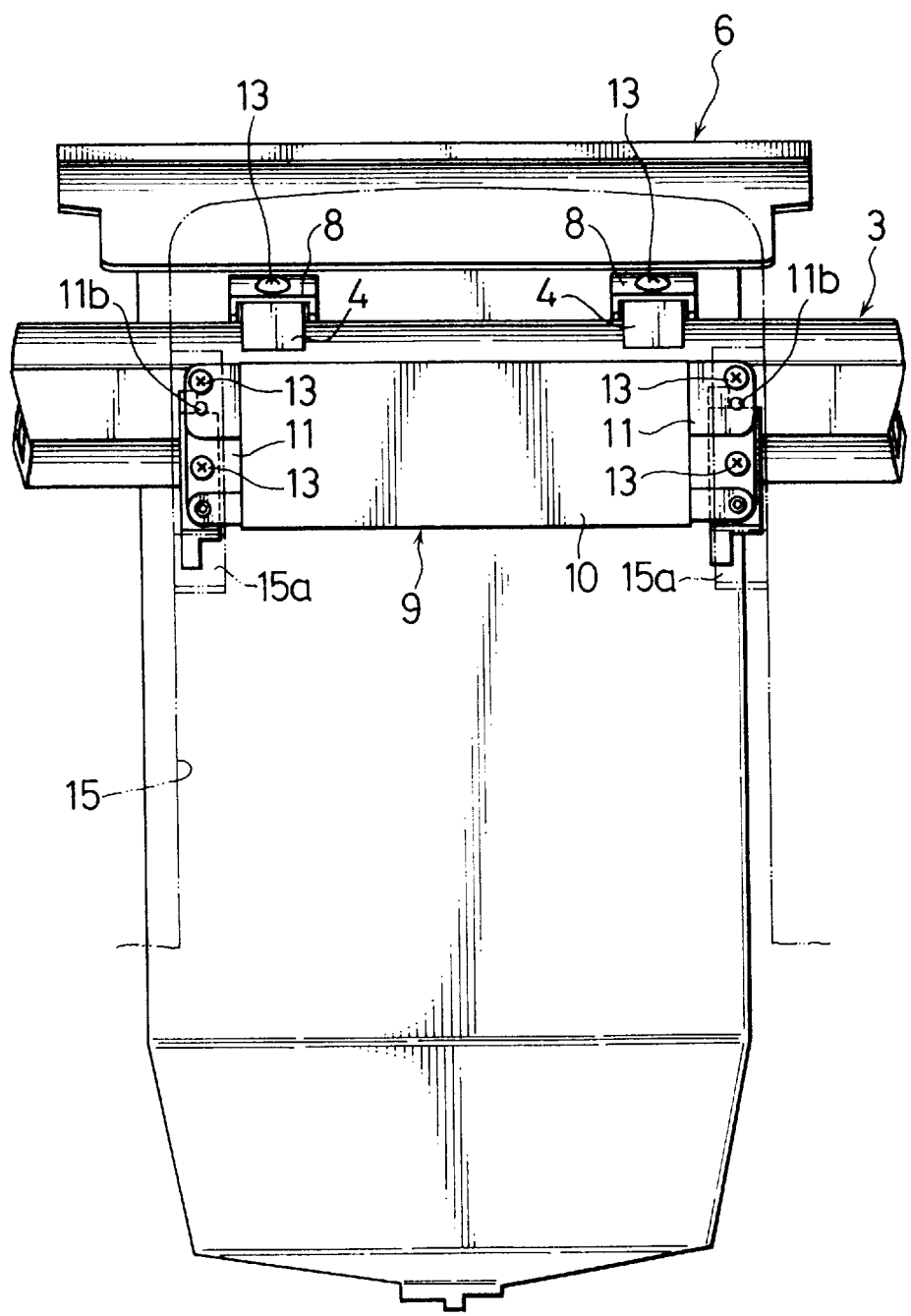
FIG. 3 is a front view of the mounting structure of FIG. 1.
Figure 4:
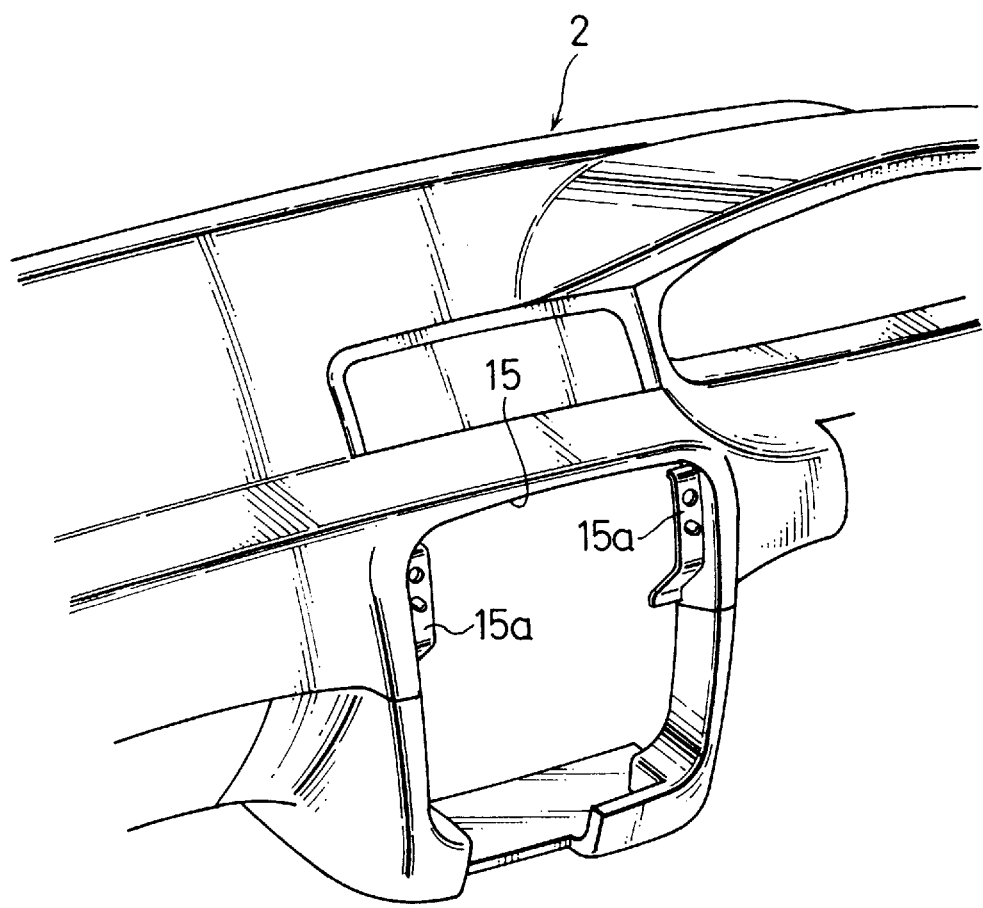
FIG. 4 is a perspective view of an instrument panel constituting the mounting structure of the first embodiment, showing an opening thereof.

A variety of embodiments of the present invention will be described with reference to the drawings.

Referring to FIGS. 1 to 4, reference numeral 1 designates a dash panel which separates an engine room E.R from a vehicle room R, 2 an instrument panel, and 3 a steering member arranged inside the instrument panel 2 in the direction of width of vehicle and composed of a pipe for supporting a not-shown steering column. The steering member 3 has respective axial ends fastened to a dash side panel which is not shown in the figure, too.

Welded to the steering member 3 at a substantial center thereof are a pair of first brackets 4, 4 which protrude upward at an appropriate distance and a pair of second brackets 5, 5 which protrude toward the vehicle room at a distance somewhat wider than a width of a heater control unit 9.

An air conditioning unit 6 comprises a casing 7 of resinous material, provided on an upper part thereof with a pair of mounting brackets 8, 8 which project rearwardly on the rear side of the casing 7.

The heater control unit 9 which adjusts a temperature and operational modes of the air conditioning unit 6 includes a casing 10 made of resinous material. The casing 10 has a pair of mounting brackets 11, 11 which is formed integral therewith so as to project from left and right side walls of the casing 10 laterally.

Both air conditioning unit 6 and heater control unit 9 are fastened to the steering member 3 before assembling the instrument panel 2 to a vehicle body.

In detail, the mounting brackets 8, 8 of the air conditioning unit 6 are overlaid on the top faces of the first brackets 4, 4 and fastened thereto through the intermediary of bolts 13 while the mounting brackets 11, 11 of the heater control unit 9 are overlaid on the rear face of the second brackets 5, 5 of the steering member 3 and secured thereto through the bolts 13.

Control cables 12 for the heater control unit 9, such as control rods, control wires, a wire harness etc., are previously connected to not-shown operated elements of the air conditioning unit 6, i.e., a variety of mode doors, water cocks, expansion valves, a fan motor or the like.

Basically, the instrument panel 2 has both ends fastened to the dash side panel though not-shown brackets and an upper front edge fastened to an upper rear edge of a cowl box 14 arranged on an upper end of the dash panel 1. On the other hand, the instrument panel 2 is attached to the vehicle body so as to pass the heater control unit 9, which has been previously fastened to the second brackets 5, 5 of the steering member 3, through the opening 15 formed at the substantial center of the panel 2. Then, respective side flanges 15a formed on both sides of the opening 15 are overlaid on the rear faces of the mounting brackets 11, 11 of the heater control unit 9 and fastened thereto by the bolts 13.

Hereat, according to the first embodiment, the steering member 3 in form of a pipe is shaped to have a hexagonal cross section and positioned so that a flat part 3a on the front side parallels the rear face of the casing 5 and abuts thereon.

The mounting brackets 8, 8 of the casing 7 are provided on respective under faces thereof with locating pins 8a, 8a projecting therefrom while the first brackets 4, 4 of the steering member 3 are provided with locating holes 4a, 4a. With the engagement of the locating pins 8a, 8a in the locating holes 4a, 4a, respectively, the air conditioning unit 6 is located in position.

Similarly, the mounting brackets 11, 11 of the heater control unit 9 are provided on respective front and rear faces thereof with locating pins 11a, 11b projecting therefrom while the second brackets 5, 5 of the steering member 3 and the side flanges 15a, 15a of the instrument panel 2 are provided with locating holes 5a, 15b, respectively. With the engagement of the locating pins 11a, 11b in the locating holes 5a, 15b, respectively, the heater control unit 9 and the instrument panel 2 can be located in respective positions, too.

In a modification, on condition that the steering member 3 has been fastened to the dash side panel in advance, the air conditioning unit 6 and the heater control unit 9 may be fastened to the first brackets 4, 4 and the second brackets 5, 5 of the steering member 3 before attaching the instrument panel 2 to the vehicle body and simultaneously, the control cables 12 may be connected. Further, in the best mode in terms of assembling workability, the air conditioning unit 3 and the heater control unit 9 are previously fixed to the steering member 3 though the first brackets 4, 4, the second brackets 8, 8 and the mounting brackets 11, 11 in a sub-line of manufacturing process. In this case, by assembling the steering member 3 to the vehicle body in a main line of the manufacturing process, it is possible to mount the air conditioning unit 6 and the heater control unit 9 on the vehicle body all at once.

According to the above-mentioned mounting structure of the embodiment, since the air conditioning unit 6 and the heater control unit 9 are fixed to the first brackets 4, 4 and the second brackets 5, 5 of the steering member 3 while the control cables 12 are connected to the operated parts of the air conditioning unit 6 before the instrument panel 2 is attached to the vehicle body, it is possible for a worker to carry out both assembling of the air conditioning unit 6 and the heater control unit 9 and electrical connecting of the control cables 12 in a free space without being restricted in terms of operative directions and posture, so that the workability can be improved remarkably.

In addition, since the connecting work of the control cables 12 can be easily executed in the free space before assembling the instrument panel 2 and there is no need to ensure a surplus of cables 12 in length in order to improve the connecting workability, it is possible to shorten the cables 12 and to reduce the number of working processes with a deletion of process for adjusting a length of the cables 12.

Since the air conditioning unit 6 and the heater control unit 9 are fixed to the steering member 3 as a reinforcement on the vehicle's body side, the mounting stability of the air conditioning unit 6 and the heater control unit 9 can be progressed advantageously.

On the other hand, since the instrument panel 2 is attached to the vehicle body while passing the heater control unit 9 fixed on the steering member 3 through the opening 15, it is possible to assemble the long instrument panel 2 on the vehicle body appropriately on positioning the panel 2 on the basis of the heater control unit 9 fixed to the steering member 3, so that an adjustment in assembling can be eliminated. Further, since such an arrangement allows the instrument panel 2 to be fitted on the heater control unit 9 temporary, the assembling workability of the instrument panel 2 can be improved.

In particular, since the side flanges 15a, 15a of the opening 15 in the instrument panel 2 are fastened to the mounting brackets 11, 11 of the heater control unit 9 respectively, the mating condition between the opening 15 and the heater control unit 9 can be enhanced thereby to improve its quality appearance.

Further, since the side flanges 15a, 15a of the opening 15 are fixed to the mounting brackets 11, 11 of the heater control unit 9 in this way, the mounting faces (rear faces) of the second brackets 5, 5 for fixing the mounting brackets 11, 11 can be reduced thereby to miniaturize the brackets 5, 5 while it is possible to enlarge degrees of freedom in designing the fastening structures between the second brackets 5, 5 and the mounting brackets 11, 11, and also between the side flanges 15a, 15a and the mounting brackets 11, 11.

Additionally, with the engagement of the locating pins 8a, 11a, 11b with the locating holes 4a, 5a, 15b respectively, since the air conditioning unit 6 and the heater control unit 9 can be positioned in a suitable manner and engaged temporary on the basis of the first brackets 4, 4 and the second brackets 5, 5 of the steering member 3, it is possible to improve the workability in assembling both air conditioning unit 6 and heater control unit 9 furthermore.

Since the air conditioning unit 6 has the rear face overlaid and abutted on the flat part 3a of the steering member 3 on the front side, the assembling stability of the air conditioning unit 6 can be enhanced while it is possible to avoid stress concentration, so that the mounting rigidity of the air conditioning unit 6 can be increased.

Regarding the mounting of both air conditioning unit 6 and heater control unit 9, providing that the units 6, 9 were fastened to the first and second brackets 4, 4, 5, 5 of the steering member 3 in the sub-line while connecting the control cables 12, it would be possible to realize an automatic assembling of the units 6, 9 in the sub-line by using robots, easily.

As mentioned above, by assembling the steering member 3 with the units 6, 9 to the vehicle body in the main line of the manufacturing process, it is possible to mount the air conditioning unit 6 and the heater control unit 9 on the vehicle body all at once, so that the automatic assembling of the units 6, 9 can be accomplished easily. Further, since the instrument panel 2 can be easily assembled on the basis of the heater control unit 9 fixed to the steering member 3, the automatic assembling of the instrument panel 2 can be realized thereby to improve a productivity of the vehicle.

Note, after the air conditioning unit 6 has been fastened to the first brackets 4, 4 of the steering member 3 as mentioned above, the upper front part of the unit 6 may be fastened to the cowl box 14 on the dash panel 1 through the bracket 16.

Figure 5:
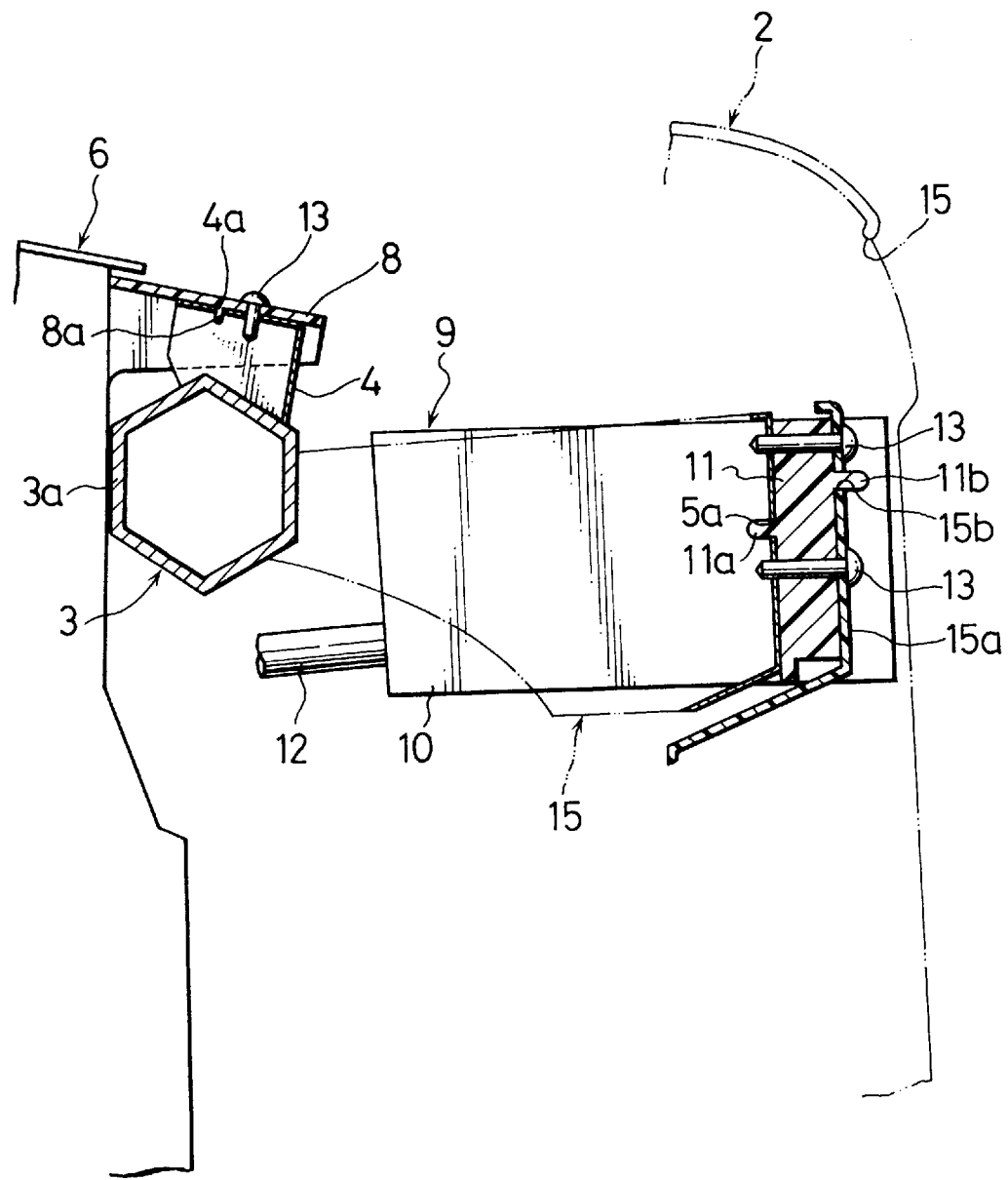
FIG. 5 is a cross sectional view of a mounting structure in a modification of the first embodiment.
Figure 6:
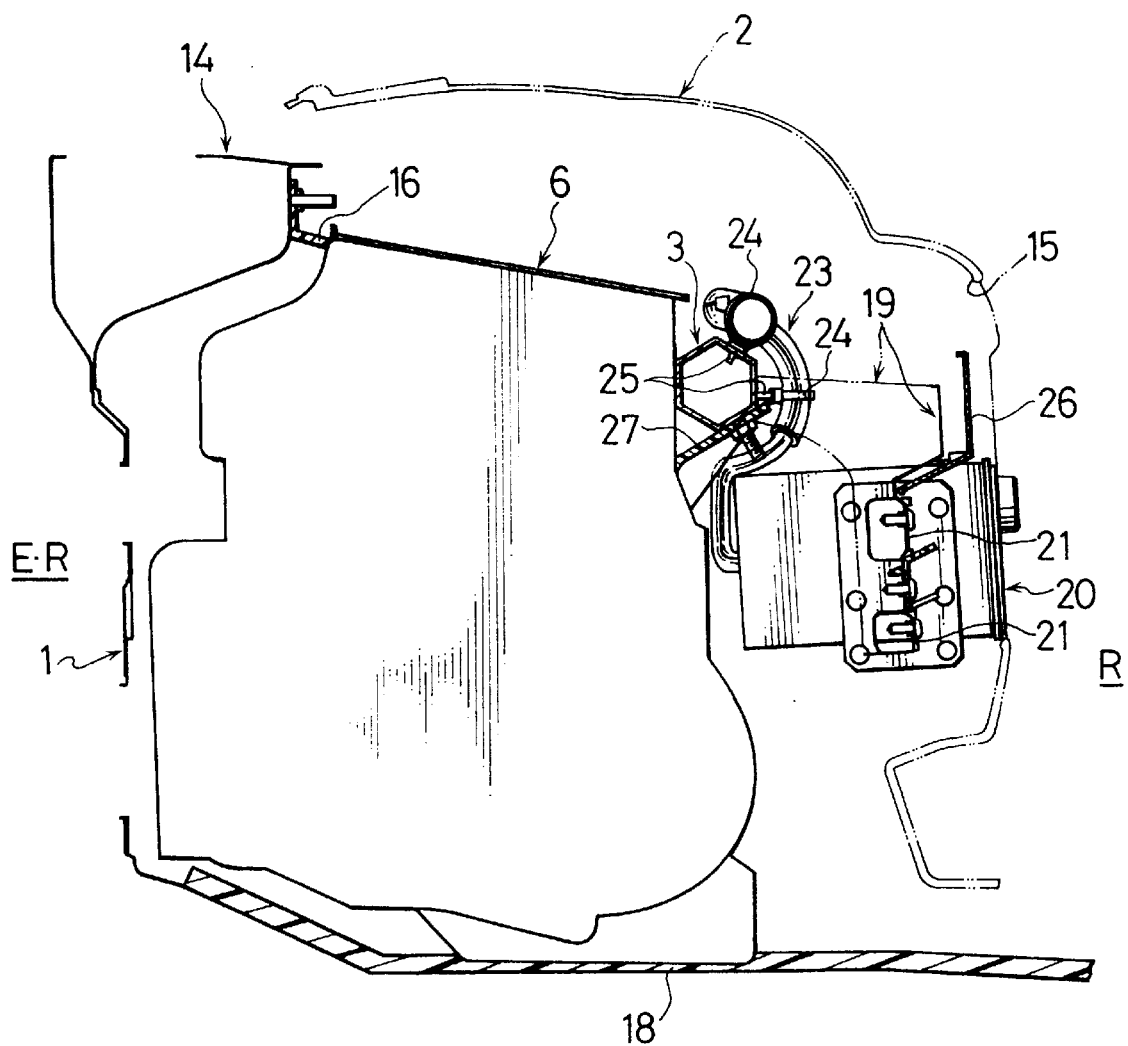
FIG. 6 is a cross sectional view of a mounting structure in accordance with a second embodiment of the present invention.
Figure 7:
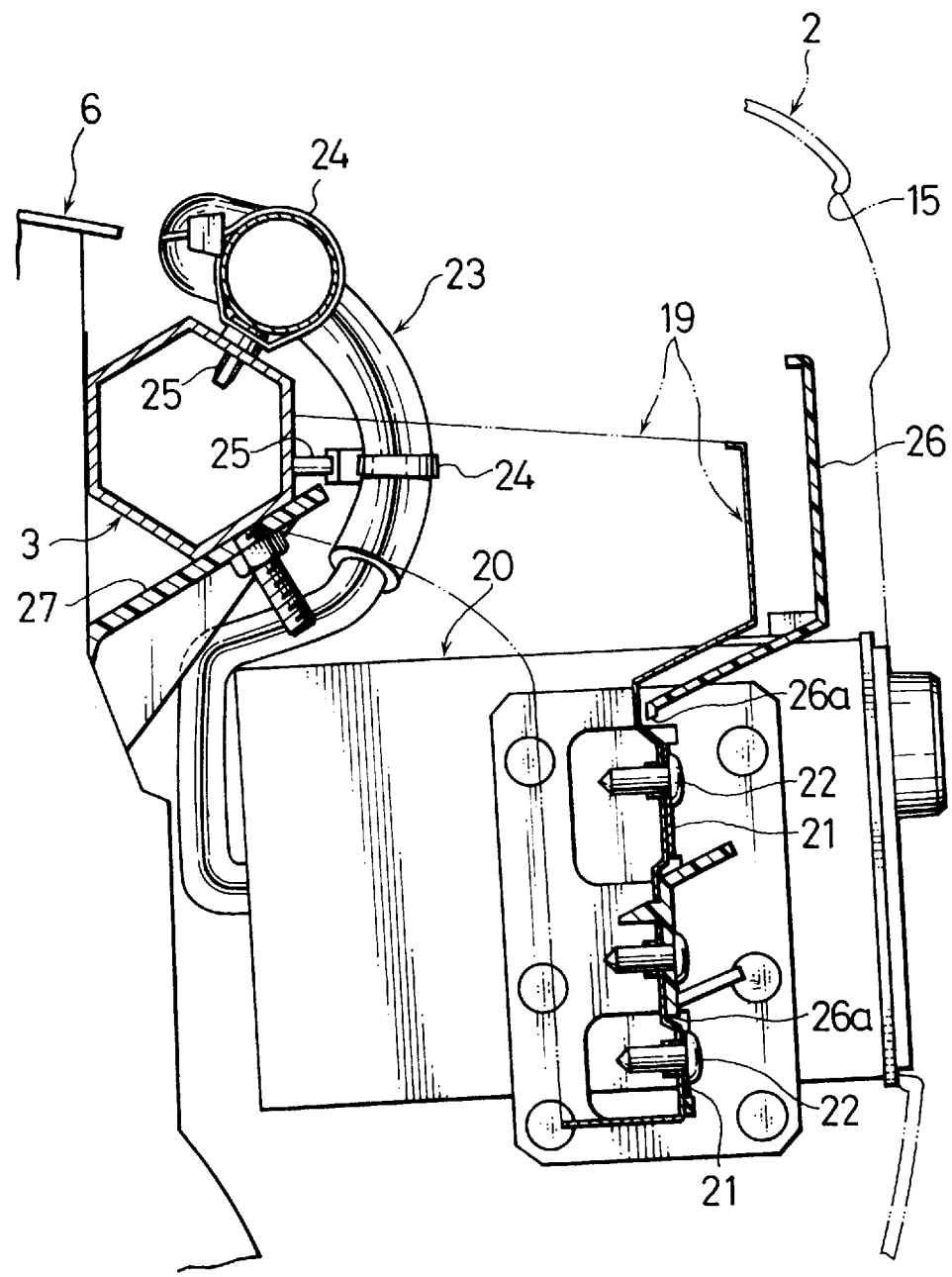
FIG. 7 is an enlarged cross sectional view of the mounting structure of FIG. 6, showing an essential part thereof.
Figure 8:
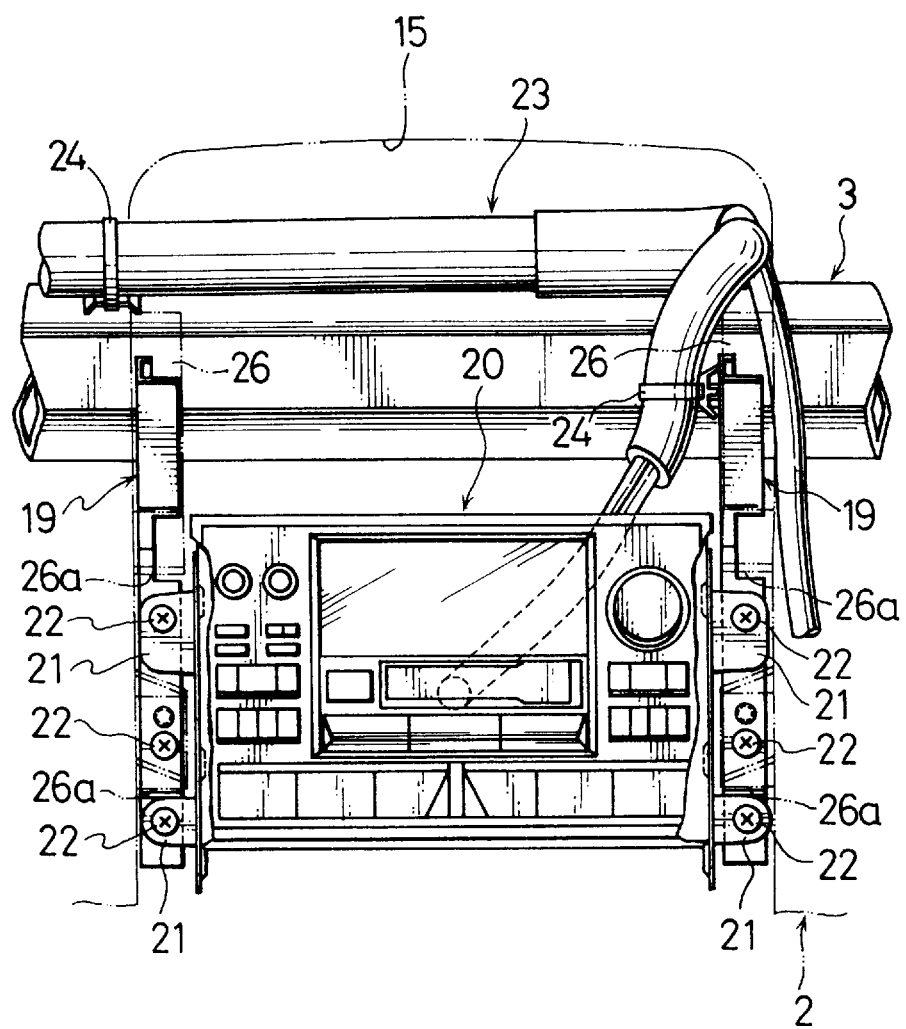
FIG. 8 is a front view of the mounting structure of FIG. 6.
Figure 9:
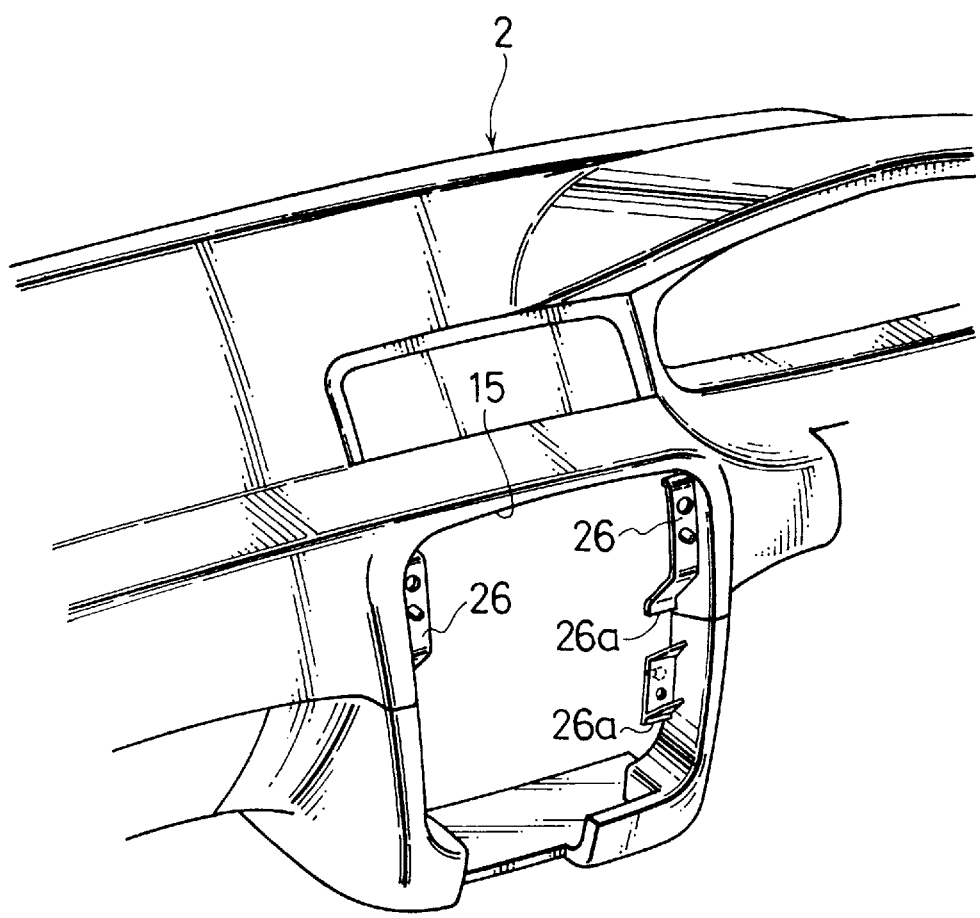
FIG. 9 is a perspective view of an instrument panel constituting the mounting structure of the second embodiment, showing an opening thereof.
Figure 10:
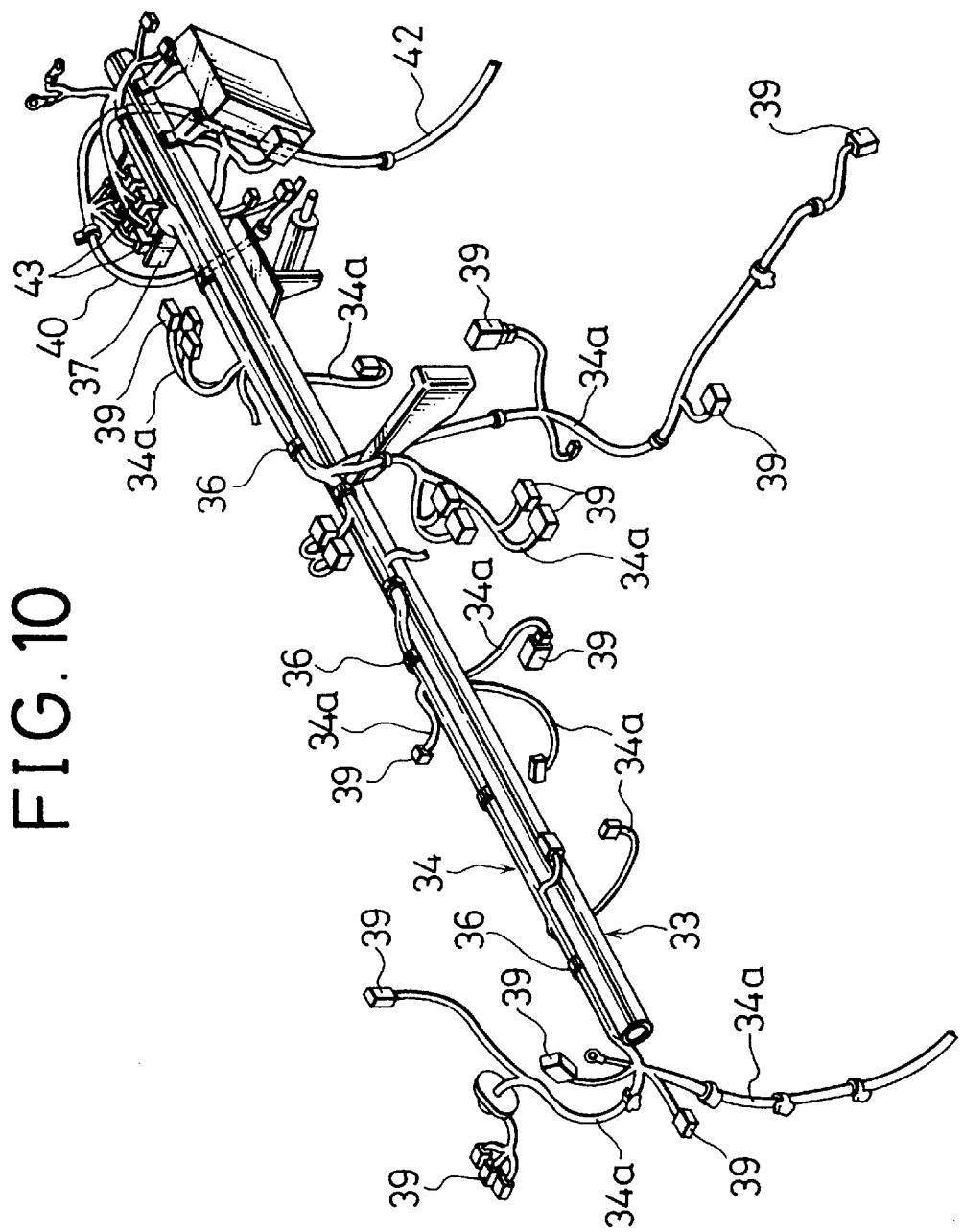
FIG. 10 is a perspective view of a wiring structure in accordance with a third embodiment of the present invention.
Figure 11:
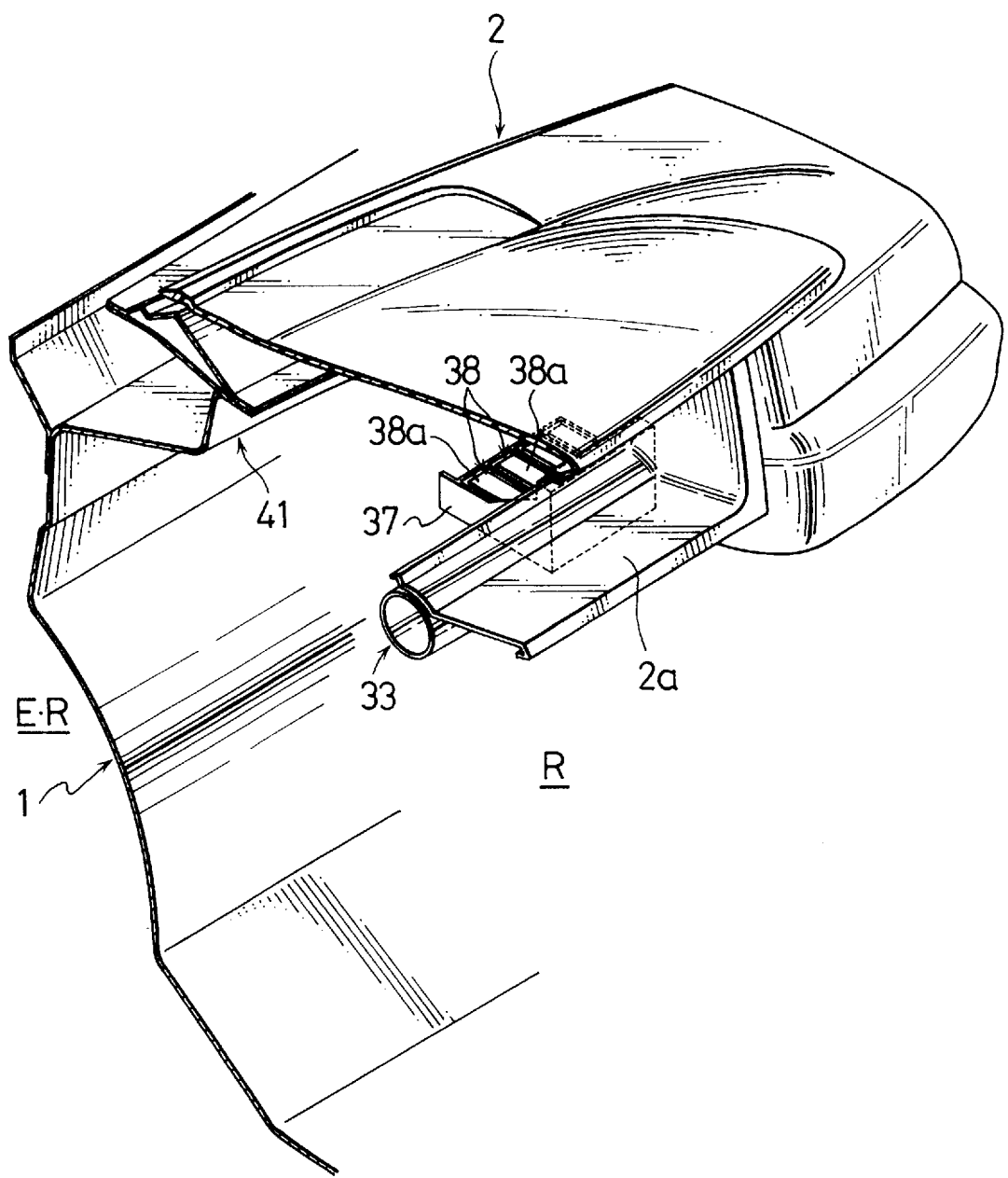
FIG. 11 is a perspective view of an instrument panel constituting the wiring structure of the third embodiment, showing an essential part thereof.
Figure 12:
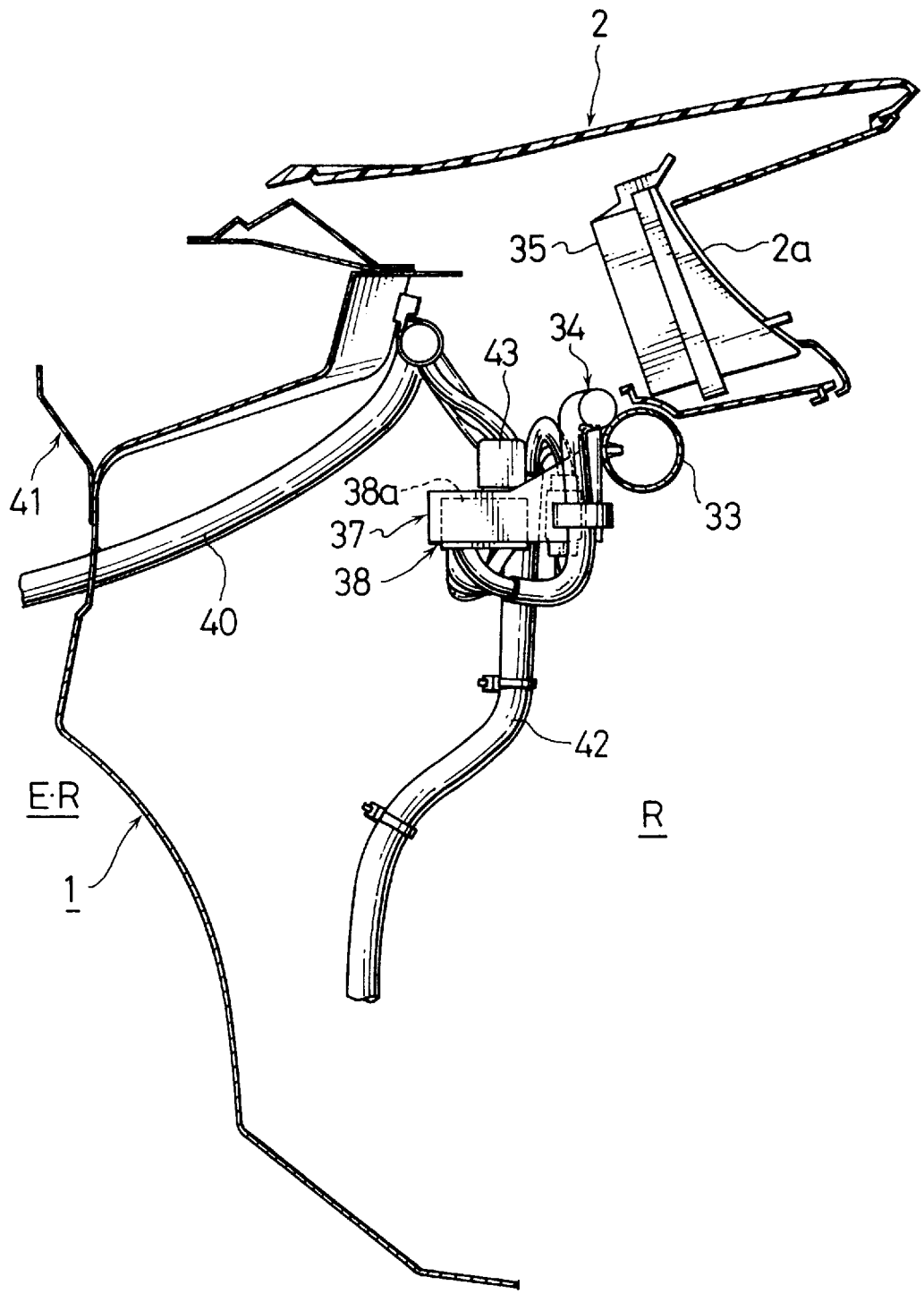
FIG. 12 is a cross sectional view of the wiring structure of FIG. 10.
Figure 13:
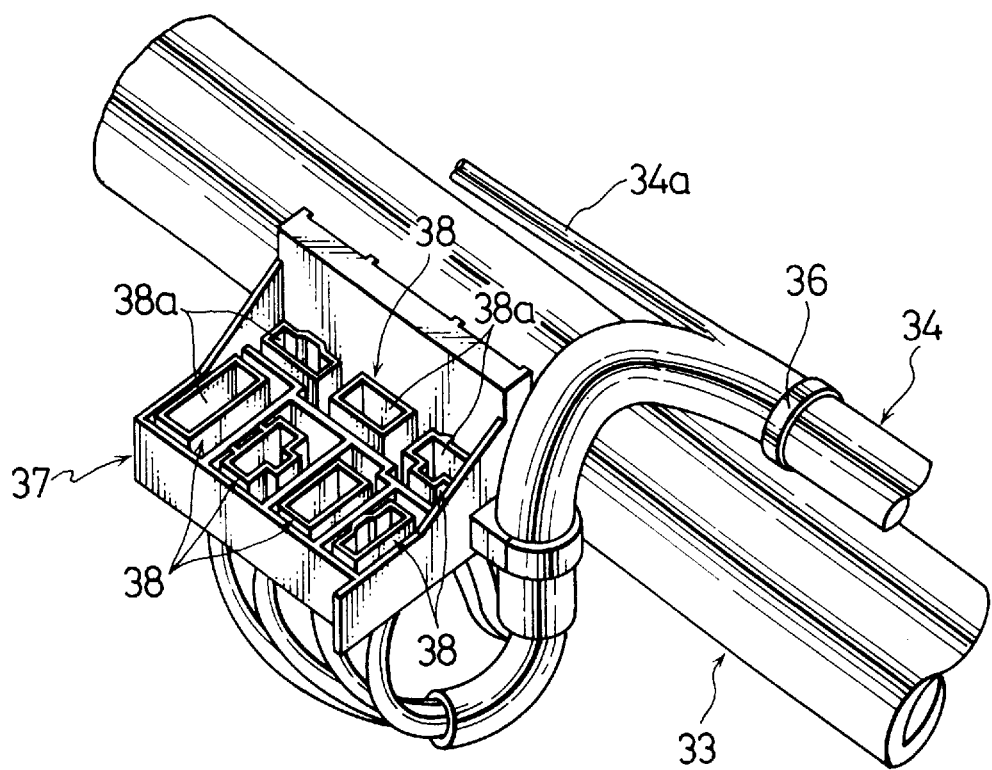
FIG. 13 is a perspective view of a bracket constituting the wiring structure of the third embodiment.

In addition, although the side flanges 15a, 15a of the opening 15 in the instrument panel 2 is fixed to the mounting brackets 11, 11 of the heater control unit 9 through the bolts 13, the side flanges 15a, 15a may be fastened to the second brackets 5, 5 of the steering member 3 together with the mounting brackets 11, 11, as shown in FIG. 5.

The second embodiment of the invention will be described with reference to FIGS. 6 to 9. Note, in these figures, elements identical to those of the first embodiment are indicated with the same reference numerals, respectively, and their functional descriptions will be eliminated from the following description.

Welded to the steering member 3 at a substantial center thereof are a pair of L-shaped brackets 19, 19 which protrude upward at an appropriate distance somewhat larger than a width of an audio unit 20.

The audio unit 20 is provided on left and right sides thereof with two pairs of mounting brackets 21, 21, 21, 21 projecting therefrom. Prior to assembling the instrument panel 2 to the vehicle body, the mounting brackets 21, 21, 21, 21 of the audio unit 20 are overlaid on the rear faces of the brackets 19, 19 and fastened thereto through the intermediary of bolts 22.

Connected to the audio unit 20 is a harness (control cables) 23 which is supported by the steering member 3 through clamps 24, 24 and clips 25, 25 in the vicinity of the unit 20.

Similarly to the first embodiment, the ends on both sides of the instrument panel 2 are fastened to the dash side panel though not-shown brackets while the upper front edge of the panel 2 is fastened to the upper rear edge of the cowl box 14 which is arranged on the upper end of the dash panel 1. On the other hand, the instrument panel 2 is attached to the vehicle body so as to pass the audio unit 20, which has been previously fastened to the brackets 19, 19 of the steering member 3, through the opening 15 formed at the substantial center of the panel 2.

The opening 15 is provided on left and right sides thereof with flanges 26 for overlapping with the rear faces of the brackets 19, 19 of the steering member 3.

Each of the flanges 26, 26 has upper and lower notches 26a, 26a formed in respective positions corresponding to the mounting brackets 21, 21 in order to prevent the flange 26 from overlapping with the brackets 21, 21. In this way, each mounting bracket 21 is fixed to the bracket 19 through the bolt 22.

In the embodiment, the air conditioning unit 6 is mounted on a vehicle floor 18 and fixed to the cowl box 14 and the steering member through the brackets 16, 27, respectively.

According to the above mentioned joint structure of the embodiment, before the instrument panel 2 is attached to the vehicle body, the audio unit 20 is fixed to the steering member 3 through the brackets 19, 19 while the harness 23 is also connected to the steering member 3. Thus, it is possible for a worker to carry out both assembling operation of the audio unit 20 and connecting operation of the harness 23 in a free space without being restricted in terms of operative directions and posture, so that the workability can be improved remarkably.

Since the harness 23 is supported by the steering member 3 through the clamps 24, 24 and the clips 25, 25, it is possible to reduce a length of the harness 23 from its drawn portion through the supported portions. In addition, since the harness 23 can be easily connected to the steering member 3 in a free space on the side of the vehicle room R and there is no need to ensure a surplus of harness 23 in length in order to improve the connecting workability, it is possible to shorten the harness 23 per se.

Since the audio unit 20 of large weight is fixed to the steering member 3 as the reinforcement on the vehicle's body side, the stability in mounting the audio unit 20 can be progressed advantageously. This means that there is no need to reinforce the instrument panel 2 in order to ensure the mounting structure of the audio unit 20, so that a structure of the panel 2 can be simplified to be effective in cost. On the other hand, since the instrument panel 2 is attached to the vehicle body while passing the audio unit 20 fixed on the steering member 3 through the opening 15, it is possible to assemble the long instrument panel 2 on the vehicle body appropriately on positioning the panel 2 on the basis of the audio unit 20 fixed to the steering member 3, so that an adjustment in assembling can be eliminated. Further, since such an arrangement allows the instrument panel 2 to be fitted on the audio unit 20 temporary, the assembling workability of the instrument panel 2 can be improved. Since the side flanges 26, 26 of the opening 15 in the instrument panel 2 are fastened to the mounting brackets 19, 19 of the audio unit 20 respectively, the mating condition between the opening 15 and the unit 20 can be enhanced thereby to improve its quality appearance.

Moreover, since the side flanges 26, 26 are overlaid on the rear faces of the brackets 19, 19 and fastened thereto, such an arrangement allows this fastening and fixing operation to be carried out in the free space behind the instrument panel 2 easily.

The third embodiment of the invention will be described with reference to FIGS. 10 to 13. In these figures, reference numeral 34 designates a main harness which supplies electricity to a variety of electric parts arranged about the instrument panel 2, such as meters 35 attached to the panel 2, various electrical parts of the audio unit 20 (FIG. 6) and not-shown sun sensors, electrical parts of the air conditioning unit 6 or the like. The main harness 34 is fixed to the steering member 33 beforehand through the intermediary of hooking members 36, 36 . . . , such as clamps, along the member 33.

The steering member 33 is provided on one side thereof with a bracket 37 which is fixed thereto so as to project forwardly and to which first connectors 38, 38 . . . on the end of the harness 34 are attached so that respective connecting orifices 38a, 38a . . . of the connectors 38, 38 . . . look upwardly.

A plurality of branch lines 34a, 34a . . . are drawn out from required positions of the main harness 34, having respective terminals 34a, 34a . . . with branch connectors 39, 39 . . . connected to not-shown harnesses on the side of electrical installations.

Reference numeral 40 denotes a harness on the side of the engine room E.R, which is drawn into the vehicle room R through the dash panel 1 and of which intermediate portion is connected to a rear face of a cowl box 41 and reference numeral 42 denotes another harness on the side of the vehicle body, which is wired along a floor side or the like to supply electricity to electrical installations on the rear side of the vehicle, such as not-shown rear speakers, brake lamps, rear lamps etc. Provided on respective ends of the above harnesses 40, 42 are second connectors 43, 43 which are to be fitted to the first connectors 38, 38 from the upside before the instrument panel 2 is assembled to the vehicle body.

According to the embodiment, the bracket 37 on the steering member 33 is positioned so as to correspond an opening formed in the instrument panel 2 for installing specific parts thereof, that is, a opening 2a for installing the meters 35 which are assembled after the instrument panel 2 has been assembled to the vehicle body.

Although the instrument panel 2 is mounted on the vehicle body by fastening both ends of the panel 2 to the dash side panel though not-shown brackets while fastening the upper front edge to an upper rear edge of a cowl box 41 by means of bolts, the above-mentioned harnesses 40, 42 are fitted in the first connectors 8 of the main harness 34 previously.

Since, in addition to an arrangement where the steering member 33 extends in the direction of width of the vehicle at a front waist portion in the vehicle room R, the main harness 34 is wired along the steering member 33 and fixed thereto by the hooking members 36 before assembling the instrument panel 2 to the vehicle body, it is possible for the worker to carry out the wiring operation easily without taking any forced posture, such as a crouch.

In addition, owing to the arrangement where the first connectors 38, 38 at the end of the main harness 34 are fitted in the brackets 37 so that the respective connecting orifices 38a, 38a direct upwardly, it is also possible for the worker to connect the first connectors 38, 38 to the second connectors 43, 43 easily since the second connectors 43, 43 of the harnesses 40, 42 can be fitted to the first connectors 38, 38 from the upside without taking any forced posture.

Again, since the first and second connectors 38, 43 are connected to each other prior to the assembly of the instrument panel 2 to the vehicle body, a visual inspection for the electrical connection therebetween can be executed easily and precisely.

Particularly in the embodiment, owing to the arrangement where the bracket 37 on the steering member 33 is positioned so as to correspond to the opening 2a for installing the meters 35, even when it is required of the above inspection or an exchanging for the above connectors, it is possible for the worker to accomplish such an operation through the opening 2a with ease.

Finally, it will be understood by those skilled in the art that the foregoing description is one of preferred embodiments of the disclosed structure and the method, and that various changes and modifications may be made to the present invention without departing from the spirit and scope thereof.

What is claimed is:

1. A mounting structure mounting an installation within a vehicle, said mounting structure comprising:

an instrument panel provided with an opening;

a steering member arranged inside the vehicle and extending in a direction of a width of said vehicle; and a bracket arranged on said steering member, said installation being mounted to the bracket, wherein the instrument panel is connected to the bracket at an edge of the opening, and covers the steering member and the installation with the opening of the instrument panel being placed around the installation such that the installation is exposed to a vehicle room of the vehicle through the opening of the instrument panel.

2. The mounting structure as claimed in claim 1, wherein said installation comprises an audio unit to be mounted in said instrument panel;

wiring of said installation connects a harness od said audio unit to said steering member; and said instrument panel is assembled to a body of said vehicle while passing said audio unit through said opening of said instrument panel.

3. The mounting structure as claimed in claim 2, wherein two brackets are provided on the steering column;

said instrument panel has side flanges formed on two sides of said opening which are fixed on said brackets so as to overlap with rear faces of said brackets, respectively.

4. The mounting structure as claimed in claim 1, further comprising a wiring connected to the installation for sending a signal to and from the installation.

5. The mounting structure of claim 4, further comprising an air conditioning unit fixed to the steering member and provided between the steering member and a dash panel of the vehicle, wherein the installation includes an air conditioning control unit for controlling the air condition unit, and the wiring connects the air conditioning unit with the air conditioning control unit.

6. The mounting structure as claimed in claim 5, further comprising two brackets spaced from each other to accommodate a width of the air conditioning unit.

7. A mounting structure mounting an installation within a vehicle, the mounting structure comprising:

an instrument panel provided with an opening;

a steering member arranged inside the instrument panel to extend in a direction of a width of the vehicle; and brackets arranged on the steering member, for mounting the installation on the steering member, wherein after wiring of the installation, the instrument panel is assembled to a body of the vehicle and the installation is exposed through the opening of the instrument panel, wherein said installation comprises an air conditioning unit and an air conditioning control unit for controlling operation of said air conditioning unit;

a wiring of said installation connects control cables of said air conditioning control unit to said air conditioning unit; and said instrument panel is assembled to a body of said vehicle while said air conditioning control unit is passed through said opening of said instrument panel.

8. The mounting structure as claimed in claim 7, wherein two brackets are provided on the steering column;

said air conditioning control unit is provided with mounting brackets which are fastened to said brackets provided on said steering column;

said instrument panel has side flanges formed on two sides of said opening which are fastened to said mounting brackets, respectively.

9. The mounting structure as claimed in claim 8, wherein each of said mounting brackets of said air conditioning control unit has a first mounting pin provided on a first mount face thereof, and each of said brackets of said steering member has a mounting hole provided on a mount face thereof engaging said first locating pin; and each of said mounting brackets of said air conditioning control unit has a second mounting pin provided on a second mount face thereof, and each of said side flanges of said instrument panel has a mounting hole provided on a mount face thereof engaging said second locating pin.

10. The mounting structure as claimed in claim 9, wherein said air conditioning unit is provided with locating pins, and said brackets of said steering member are provided on respective mount faces thereof with locating holes engaging said locating pins of said air conditioning unit.

11. The mounting structure as claimed in claim 10, wherein said steering member has a front portion facing an engine room of the vehicle, which includes a flat surface which a rear face of said air conditioning unit overlays and abuts.

12. The mounting structure as claimed in claim 8, wherein said air conditioning unit is provided with locating pins, while said brackets of said steering member are provided on respective mount faces thereof with locating holes engaging said locating pins of said air conditioning unit.

13. The mounting structure as claimed in claim 9, wherein said air conditioning unit is provided with locating pins, while said brackets of said steering member are provided on respective mount faces thereof with locating holes engaging with said locating pins of said air conditioning unit.

14. A mounting structure mounting an installation within a vehicle, said mounting structure comprising:

an instrument panel provided with an opening;

a steering member arranged inside said instrument panel to extend in a direction of a width of said vehicle;

a main harness wired along said steering member and supplying electricity to said installation;

a first side harness supplying electricity to a first installation located in an engine room of said vehicle;

a second side harness supplying electricity to a second installation located at a rear side of said vehicle;

a bracket fixed on said steering member;

first connectors connected to said main harness and fitted in said bracket; and second connectors connected to said first side harness and said second side harness, said second connectors engaging said first connectors, wherein, after the engagement of said second connectors with said first connects, said instrument panel is assembled to a body of said vehicle so that the steering member is inside said instrument panel.

15. The mounting structure as claimed in claim 14, wherein said bracket is positioned in a vicinity of said opening of said instrument panel.

16. A method of mounting an installation within a vehicle, said method comprising steps of:

arranging a steering member inside the vehicle to extend in a direction of a width of said vehicle;

mounting brackets on the steering member;

mounting said installation on the steering member via the brackets;

covering the steering member and the installation with an instrument panel having an opening, such that the installation is exposed to a vehicle room of the vehicle through the opening of the instrument panel; and connecting the instrument panel to the brackets at an edge of the opening.

17. The method as claimed in claim 16, further comprising:

mounting an audio unit in said instrument panel;

connecting a harness of said audio unit to said steering member; and assembling said instrument panel to a body of said vehicle while aligning said audio unit with said opening of said instrument panel.

18. A method of mounting an installation within a vehicle, the method comprising steps of:

providing a steering member inside an instrument panel of the vehicle;

mounting the installation on the steering member via brackets;

wiring the installation; and assembling the instrument panel to a body of the vehicle while aligning the installation with an opening formed in the instrument panel, wherein said fixing step comprises steps of:
fastening an air conditioning unit to some of said brackets mounted on said steering member while fastening an air conditioning control unit to other of said brackets mounted on said steering member; and
connecting control cables of said air conditioning control unit to said air conditioning unit; and said assembling step comprises steps of:
fastening said steering member, to which said air conditioning unit and said air conditioning control unit have been assembled, to a body of said vehicle;
aligning said air conditioning control unit with said opening of the instrument panel;
fastening said instrument panel to said vehicle body; and
fastening side edges of said opening to said air conditioning control unit.

* * * * *